United States Patent Office 2,704,284
Patented Mar. 15, 1955

2,704,284

THERAPEUTIC COMPOUNDS

Arthur W. Weston, Waukegan, Ill., assignor to Abbott Laboratories, North Chicago, Ill., a corporation of Illinois No Drawing. Application June 28, 1952,
Serial No. 296,238

7 Claims. (Cl. 260—247.2)

This invention relates generally to novel physiological active substances and more specifically to derivatives of arylcycloalkane carboxylic acids which are useful therapeutically as antispasmodics. (Substances which have a relaxing effect on smooth muscle.)

This application is a continuation-in-part of my co-pending application S. N. 600,241 filed June 18, 1945, now abandoned.

The novel compounds to which this invention pertains are selected from members of the group consisting of an ester of the formula

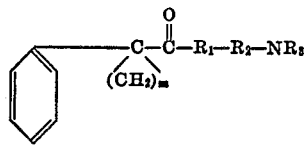

the acid addition salts thereof and the quaternary ammonium salts thereof, wherein $m$ is an integer from 2–5 inclusive, $R_1$ is O, $R_2$ is a lower alkylene group and $NR_3$ is a monocyclic, heterocyclic, nitrogen containing group.

The monocyclic, heterocyclic, nitrogen containing group referred to herein includes the morpholine, piperidyl and pyrollidyl groups as well as other less commonly known members of this class.

The term "lower alkylene group" as used herein to define the symbol $R_2$ is intended to include the $CH_2$, $C_2H_4$, $C_3H_6$, $C_4H_8$, $C_5H_{10}$, $C_6H_{12}$ and similar radicals and the branched chain equivalents thereof.

These compounds have been found to have valuable therapeutic properties, especially as antispasmodic agents. They may be administered orally or parenterally. For oral use, they may be prepared in liquid form, or in solid form as powder or tablets, either alone or in admixture with other substances. Usually these substances are more soluble in water when in the form of acid addition salts rather than as the free bases. Any acid which produces a water-soluble salt and does not appreciably enhance the toxicity is suitable for use in forming the salts. Such acids as sulphuric, phosphoric, hydrochloric, levulinic, mucic, acetic and tartaric acid are among those which are satisfactory. The salts produced by combination of these bases with certain other non-toxic acids such as tannic acid are very sparingly soluble in water. These sparingly soluble compounds, as well as the free bases, may be administered when the pharmacological effect desired should be slow in onset and relatively long in duration. Where any ester or amide is mentioned in the following product claims, it is intended to include both the free base and the salts. It will be obvious that such addition compounds as the quaternary ammonium salts, of which the methiodide of Example 1C is an illustration, may be derived from any of the other examples of esters or amides and by use of other organic halides or sulfates.

The compounds included in this invention may be prepared according to the specific instructions given in the hereinafter presented examples and by numerous other methods. For instance the 1-arylcycloalkane-1-carboxylic acid is neutralized with an alcoholic solution of an alkali metal hydroxide (such as the hydroxide of sodium or potassium). The mixture is concentrated to dryness and then heated with the appropriate aminoalkyl halide. The resulting mixture is washed with water, concentrated, dried, and distilled (under reduced pressure, if necessary). Or if there is used an organic halide containing two halogen atoms per molecule and only one has reacted with the alkali metal salt then the monohalogen compound is allowed to react with the appropriate substance (such as an alkyl amine) to replace the remaining halogen atom by the desired group. The reaction may be carried out by heating for several hours in an organic solvent such as benzene. The mixture is then washed with water, dried, concentrated and purified by distillation (under reduced pressure, if necessary).

The esters may also be produced as follows: The 1-aryl-1-cycloalkane carboxylic acid halide is heated with the desired halogen substituted alcohol to produce a haloalkyl ester. This ester is then heated with the desired amine with or without the addition of solvent. The resulting amino ester of the 1-aryl-cycloalkane-1-carboxylic acid may be purified as above.

Compounds such as those produced by the above general methods are converted to acid addition salts by dissolving them in an organic solvent such as ether and adding the desired acidic material such as a dry hydrogen chloride gas or concentrated sulphuric acid. The salt precipitates and is then filtered off and dried. It is further purified by recrystallization from organic solvents.

Quaternary ammonium salts are produced by treating the bases such as those formed in methods outlined above with the appropriate organic halide or sulfate. This is done by mixing the two reactants with or without the use of a diluent such as an organic solvent. The crude product is recrystallized from organic solvents.

To produce the salts of the esters previously described the appropriate 1-aryl-1-cycloalkane carboxylic acid is heated with the appropriate dialkyl aminoalkyl halide, in presence of a solvent such as isopropyl alcohol, dioxane, etc.

Instead of the starting materials mentioned in the preceding sentence there may be substituted a salt of the 1-aryl-1-cycloalkane carboxylic acid and a salt of the alkyl aminoalkyl halide.

The invention is disclosed in further detail by the following examples which are provided solely for the purpose of illustrating the invention and which are intended in no way to be construed as limiting it in spirit or in scope. Relative amounts of materials are given in parts by weight unless otherwise indicated.

EXAMPLE 1A

γ-Morpholino-β,β-dimethylpropyl 1-phenylcyclohexane-1-carboxylate

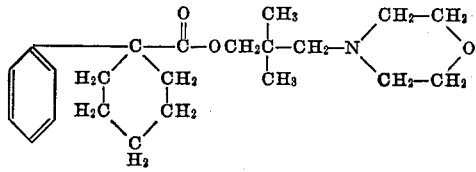

A mixture of 20.4 parts of 1-phenylcyclohexane-1-carboxylic acid and 30 parts of thionyl chloride is converted into the acid chloride by heating on a steam bath for four hours. The acid chloride is dissolved in 100 cc. of chloroform, treated with 34.6 parts of γ-morpholino-β,β-dimethyl propyl alcohol, then stirred and refluxed several hours. The reaction mixture is washed first with dilute sodium hydroxide, then with water and finally dried, concentrated, and distilled. The γ-morpholino-β,β-dimethylpropyl 1-phenylcyclohexane-1-carboxylate thus obtained amounts to 31.7 parts or 88% of theory. It solidifies and after crystallizing from dilute alcohol melts at 54–55° C.

EXAMPLE 1B

The hydrochloride formed by treating the base described in Example 1A with hydrogen chloride in a suitable solvent can be crystallized from acetone. It melts at 180–181° C.

EXAMPLE 1C

The methiodide of the base mentioned in Example 1A is prepared by allowing the base to react with methyl iodide at room temperature. The quaternary ammonium

EXAMPLE 2A

ω-Morpholinohexyl 1-phenylcyclohexane-1-carboxylate

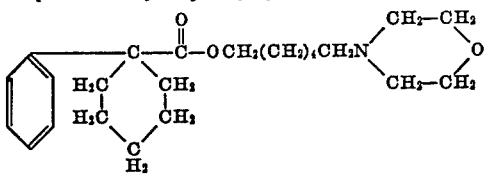

1-phenylcyclohexane-1-carboxylic acid chloride, prepared from 22.1 parts of the corresponding acid and 30 parts of thionyl chloride, is treated with 34.3 parts of ω-morpholino-N-hexanol and the reaction product isolated as described in Example 1A. The ω-morpholinohexyl 1-phenylcyclohexane-1-carboxylate is thus obtained in an 87% yield. It boils at 228–231° C. at 4 mm. and has $n_D^{27}$, 1.5155.

This base may also be prepared by an alternate method as follows:

87.7 parts of the above acid is neutralized with an alcoholic solution of potassium hydroxide. The potassium salt obtained by concentrating the resulting solution is dried and then heated at 100° C. for 18 hours with excess hexamethylene dibromide. The reaction mixture is washed with water, concentrated, dried and distilled. The ω-bromohexyl 1-phenylcyclohexane-1-carboxylate thereby produced amounts to 126 parts or 80% of theory. It boils at 204–205° C. at 4 mm. and has $n_D^{24}$, 1.5284.

A solution of 123.5 parts of this bromohexyl ester and 59.0 parts of morpholine in 200 parts of benzene is refluxed and stirred for 5.5 hours. After washing with water, the benzene layer is concentrated, dried, and distilled whereby 108 parts or an 80% yield of the ω-morpholinohexyl 1-phenylcyclohexane-1-carboxylate, boiling point, 228–229° C. at 3 mm., $n_D^{24.5}$, 1.5165 is obtained.

EXAMPLE 2B

The hydrochloride prepared in the usual manner from the base described in Example 2A melts at 121–123° C. after crystallization from ethyl acetate.

EXAMPLE 3

γ-Morpholinopropyl 1-phenylcyclohexane-1-carboxylate

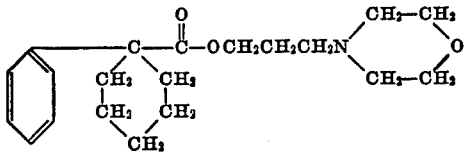

10.2 parts of 1-phenylcyclohexane-1-carboxylic acid is converted to its potassium salt by a method similar to that described in Example 2A. A suspension of this potassium salt in 100 parts of toluene is treated with excess γ-chloropropyl-morpholine and the mixture refluxed and stirred for 15 hours. The hydrocarbon layer, after washing with water, is dried and distilled whereby 15.2 parts or a 92% yield of γ-morpholinopropyl 1-phenylcyclohexane-1-carboxylate, boiling point 202–203° C. at 2 mm., $n_D^{26}$, 1.5238 is obtained.

The hydrochloride is prepared by previously described method and is crystallized from absolute alcohol to a product melting at 174–175° C.

EXAMPLE 4

γ-Morpholinopropyl 1-phenylcyclopropane-1-carboxylate

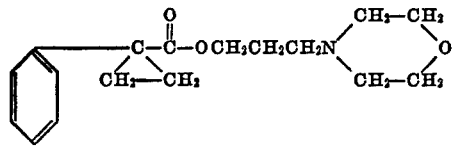

A solution of 25 parts of 1-phenylcyclopropane-1-carboxylic acid chloride in 20.5 parts of trimethylene bromohydrin is heated on the steam bath overnight. The reaction mixture is distilled directly. The γ-bromopropyl 1-phenylcyclopropane-1-carboxylate boils at 151–153° C. at 3 mm.

11.3 parts of this bromo ester is dissolved in 50 parts of dry benzene. Then there is added 7.3 parts of morpholine. The solution is refluxed and stirred several hours. Washing with water removes the precipitated morpholine hydrobromide and any unused morpholine. The benzene layer is then extracted with acid. Addition of alkali to this acidic extract regenerates the free base of the product which is dissolved in ether. The solvent is then removed and the residue distilled. The γ-morpholinopropyl 1-phenylcyclopropane-1-carboxylate boiling at 173–175° C. at 2 mm. amounts to 8.5 parts.

The hydrochloride is prepared by previously described methods and, after crystallization from absolute alcohol is found to melt at 168–169° C.

EXAMPLE 5

The compound γ-piperidinopropyl 1-phenylcyclopropane-1-carboxylate is prepared according to the instructions given in Example 4 but substituting piperidine for the morpholine of that example.

EXAMPLE 6

The compound γ-pyrolidinopropyl 1-phenylcyclopropane-1-carboxylate is prepared similarly to the instructions given in Example 4, substituting pyrolidine for the morpholine of that example.

EXAMPLE 7

The quaternary ammonium salt of ω-morpholinohexyl 1-phenylcyclohexane-1-carboxylate is prepared by dissolving 1.86 parts of the base obtained in Example 2A and 1.4 parts of methyl iodide in 50 parts of dry ether. The methiodide salt which slowly separates from the solution is collected by filtration and crystallized from absolute alcohol. The product melts at 135–136° C.

Others may readily adapt the invention for use under various conditions of service, by employing one or more of the novel features disclosed or equivalents thereof. As at present advised with respect to the apparent scope of my invention, I desire to claim the following subject matter.

I claim:

1. The basic esters of the formula

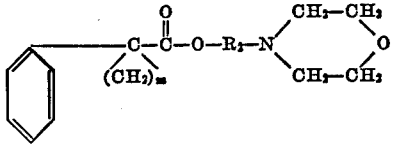

in which m is an integer from 2 to 5 and R₂ is a lower alkylene group; their acid-addition salts and their quaternary ammonium salts.

2. The basic esters of the formula

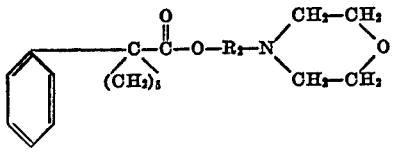

in which R₂ is a lower alkylene group; their acid-addition salts and their quaternary ammonium salts.

3. The basic esters of the formula

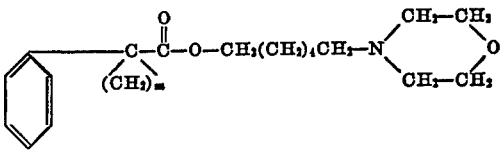

in which m is an integer from 2 to 5; their acid addition salts and their quaternary ammonium salts.

4. The compound γ-morpholino-β,β-dimethylpropyl 1-phenylcyclohexane-1-carboxylate represented by the formula:

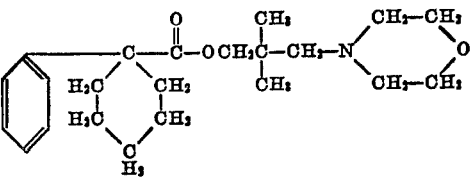

its acid addition salts and its quaternary ammonium salts.

5. The compound ω-morpholinohexyl 1-phenylcyclohexane-1-carboxylate represented by the formula:

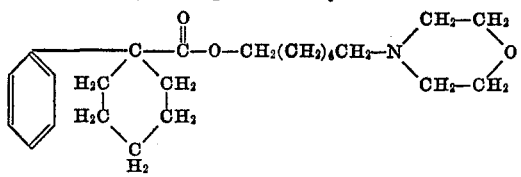

its acid addition salts and its quaternary ammonium salts.

6. The compound γ-morpholinopropyl 1-phenylcyclohexane-1-carboxylate, represented by the following formula:

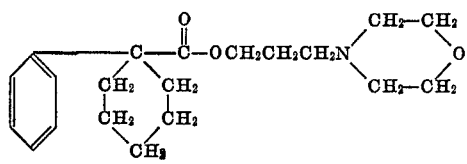

its acid addition salts and its quaternary ammonium salts.

7. The compound γ-morpholinopropyl 1-phenylcyclopropane-1-carboxylate represented by the following formula:

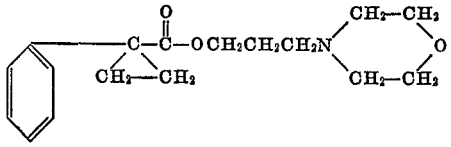

its acid addition salts and its quaternary ammonium salts.

References Cited in the file of this patent

UNITED STATES PATENTS

| | | |
|---|---|---|
| 2,404,588 | Martin et al. | July 23, 1946 |
| 2,573,015 | Hafliger et al. | Oct. 30, 1951 |
| 2,589,937 | Hafliger et al. | Mar. 18, 1952 |

FOREIGN PATENTS

| | | |
|---|---|---|
| 240,162 | Switzerland | May 16, 1946 |
| 249,036 | Switzerland | Mar. 16, 1948 |
| 249,041 | Switzerland | Apr. 1, 1948 |
| 249,042 | Switzerland | Apr. 1, 1948 |
| 582,535 | Great Britain | Nov. 20, 1946 |